Feb. 24, 1948.
G. J. STREZYNSKI
2,436,498
APPARATUS FOR USE IN THE CENTRIFUGAL SEPARATION
OF SERUM FROM CHEESE CONSTITUENTS
Filed May 5, 1944
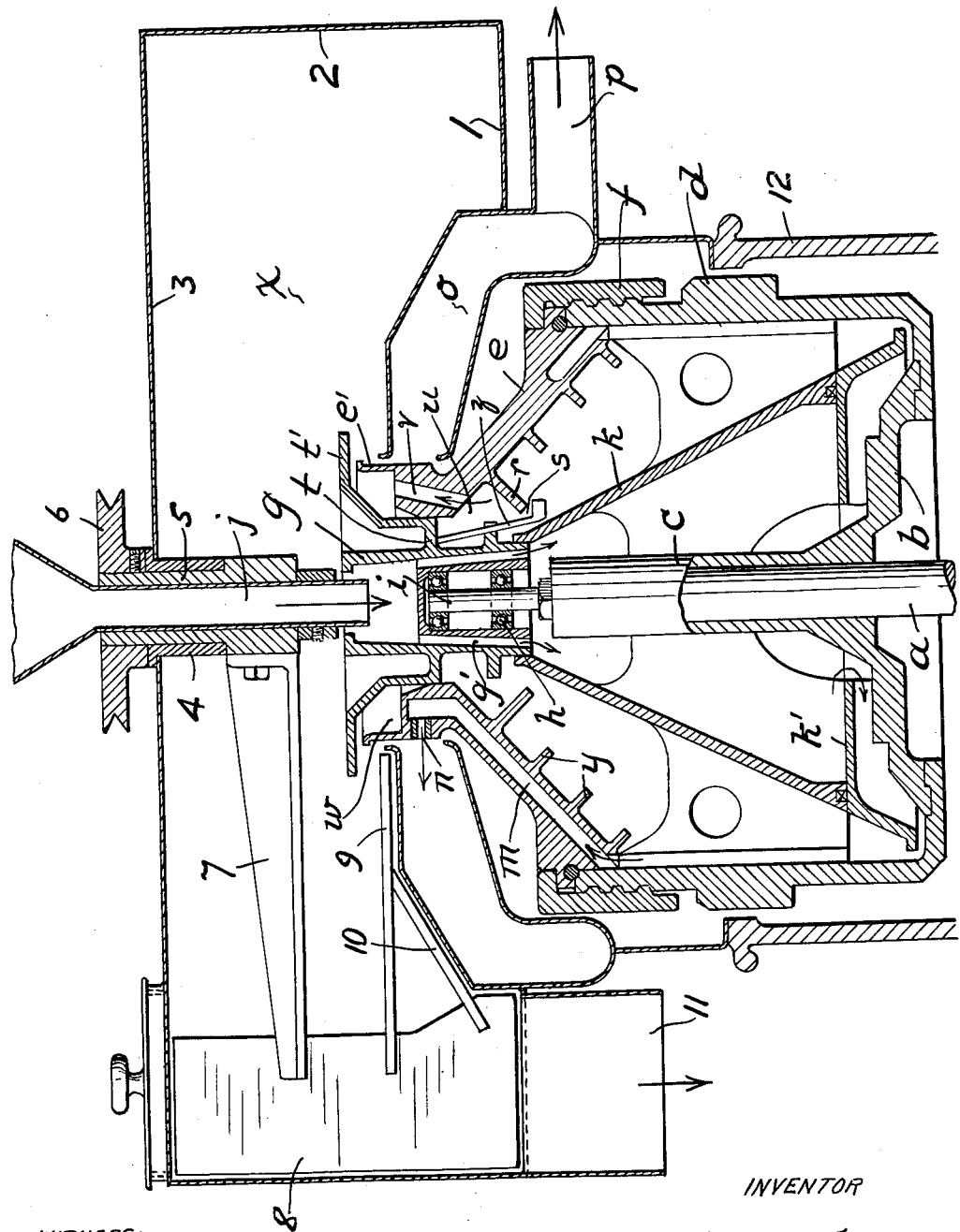
WITNESS:
Rob R Kichel.
INVENTOR
George J. Strezynski
BY
Busser and Harding
ATTORNEYS.

Patented Feb. 24, 1948

2,436,498

UNITED STATES PATENT OFFICE 2,436,498

APPARATUS FOR USE IN THE CENTRIFUGAL SEPARATION OF SERUM FROM CHEESE CONSTITUENTS

George J. Strezynski, Chicago, Ill., assignor to The De Laval Separator Company, New York, N. Y., a corporation of New Jersey Application May 5, 1944, Serial No. 534,238

12 Claims. (Cl. 233—4)

In the manufacture of various kinds of cheese, it is customary to take curdled whole milk or its equivalent, add thereto butterfat in proportions varying from nought to ten per cent. of the total mix, dependent on the kind of cheese to be made, subject the mixture to the action of a homogenizer, and then, by a long established conventional procedure, including a prolonged period of drainage, separate the whey or serum, leaving a product composed mainly of butterfat and milk solids. One of the serious objections to the conventional method of cheese manufacture is that the prolonged time required for the separation of the whey or serum effects physical or chemical changes, or both, that deleteriously affect the flavor, and particularly the keeping qualities, of the cheese.

A primary object of my invention is to produce cheese of superior flavor whose keeping qualities are greatly superior to cheese produced by conventional methods. It has been found that if the separation of whey or serum is effected promptly and rapidly after homogenization, the cheese will suffer no deterioration even if kept in storage for a period of time long exceeding that which would normally elapse between the date of manufacture of the marketable product and the dates of its sale and consumption. I have found that it is practicable to effect rapid separation of the whey or serum by centrifugal force. However, centrifuges of conventional type—whether adapted to separate liquids of different specific gravities, as, for example, in the separation of cream from whole milk, or to separate liquids from solids, whether the solids are heavier or lighter than the liquid, as, for example, in the separation of wax from a chilled solution of mineral oil and diluent—are not adapted to the separation of the whey or serum from the butterfat and solids constituting the cheese constituents. I have found it necessary, in order to satisfactorily accomplish this purpose, to design special types of centrifugal separators embodying certain new and useful structural features. One such separator is disclosed in an application for patent filed by me April 20, 1944, Serial No. 531,908. The separator forming the subject matter of this invention embodies certain important features of such other separator, but embodies certain modifications thereof, the principal of which are substantially different specific means for insuring a uniform and continuous discharge of the separated cheese constituents from the separating chamber of the bowl and somewhat different means for discharging from the centrifuge the separated serum and cheese.

The drawing is a vertical sectional view of a preferred embodiment of my invention.

The bowl body is of conventional construction and comprises a bottom $b$ having an upright sleeve $c$ for the reception of the driving spindle $a$, a shell $d$ and a top $e$, the latter being secured to the shell $d$ by means of a ring $f$ threaded on the shell $d$ and having a flange overlying the peripheral part of the top.

The bowl neck $g$, instead of being integral with or secured to the bowl top, is turnable relatively thereto, preferably through roller bearings $h$ between it and a stem $i$ projecting up from the sleeve $c$ or spindle $a$. To the neck $g$ is secured a frusto-conical partition $k$ dividing the interior of the bowl into an inner or central preliminary purifying chamber or distributor of relatively small capacity and an outer annular separating chamber of relatively great capacity.

Into the upper end of neck $g$ extends the lower end of a feed tube $j$. The thickened lower end of the neck $g$ is provided with channels $g'$; the mixture to be separated, delivered by the feed tube $j$ into the upper part of the neck $g$, flowing through these channels into the inner preliminary purifying chamber, or distributor, enclosed by the frusto-conical partitioning member $k$.

The partition $k$ extends nearly to the bottom of the bowl and has at its lower and wider end an inwardly extending flange $k'$ over the inner edge of which the homogenized mixture of curdled milk, butterfat and solids, after passing through the inner purifying chamber, escapes to and through the annular passage beneath the flange into the outer or separating chamber. Since there is only one outlet from the inner chamber to the outer chamber, substantially the entire mixture fed through the feed tube $j$ enters the outer chamber. If, however, the mixture contains any heavy solid impurities, the mild centrifugal force operative in the inner chamber will effect their separation, and such impurities will accumulate in the angle formed between the partition $k$ and its flange $k'$. The proportion of such impurities is, however, so small that the centrifuge will operate for a prolonged time without excessive accumulation thereof.

In the outer chamber occurs the separation of the whey or serum from the lighter butterfat and solids. The serum is heavier than the cheese constituents and will therefore be thrown to the periphery, while the lighter constituents will be displaced inward. The serum continually escapes at the periphery of the bowl, through a passage $m$ formed in the bowl top and thence escapes, through a nozzle $n$, and discharges into a stationary annular receiving pan or trough $o$, whence it flows into a pipe $p$ communicating with the ultimate receiver (not shown) for the serum.

The separated relatively solid cheese constituents, displaced inwardly toward the axis of rotation, are not free flowing. In an ordinary centrifuge, they would accumulate in the central separating zone and clog the discharge. Where, however, the inner zone is bounded by the frustoconical partition $k$, the cheese constituents will continuously slide upward along the partition wall and continuously discharge from the separating zone through an annular opening $s$ formed between an annular wall $r$, projecting down from the bowl top, and the upper end of the partitioning member $k$. The upper end of the partition $k$ and the cheese discharge $s$ should be preferably substantially above the level of the lower end of the bowl top and of the serum discharge into the passage $m$.

The neck $g$ is provided with an annular wing $t$ extending from the neck outward, thence upward into sliding contact with the upper end of the bowl top $e$, thereby centralizing the neck $g$ and forming between the neck, the wing $t$, the bowl top $e$ and the wall $r$, a chamber $u$ for receiving the cheese constituents and from which they flow, through a passage $v$, into another chamber $w$ enclosed by the upper end of the bowl top, a ring $e'$ extending upward from the periphery of the bowl top, the wing $t$ and an outward extension $t'$ therefrom. The extension $t'$ of wing $t$ overlies and extends beyond the upper end of ring $e'$. The cheese constituents flowing through passage $v$ into chamber $w$ escape through the narrow opening between the extension $t'$ of wing $t$ and the upper edge of the ring $e'$ into a surrounding stationary receiving chamber $x$ above the receiving pan $o$.

Extending downward from bowl top $e$ are one or more annular flanges forming dams $y$, which prevent any serum that may be separated in the upper part of the main separating chamber from flowing up along the lower wall of the bowl top and mixing with the separated cheese. The dams $y$ divert this serum downward into the neutral zone of the separating chamber and therein it is again separated from the cheese constituents at a level sufficiently low to effect its discharge into the passage $m$.

From that part of the foregoing description relating to the means for supporting the neck $g$ from the driving spindle $a$, it will be understood that neck $g$ and the parts carried thereby do not partake of the revolving movement of the spindle, the bowl and the parts carried thereby. However, the neck $g$ and the parts carried thereby are free to revolve and, due largely to the movement of rotation imparted to the partition $k$ by the rotation of the mixture in the main separating chamber, will revolve on its roller bearings in the direction of the rotation of the bowl but at a slower speed. One main advantage of this differential speed arrangement is that it enables, or facilitates, the provision of means whereby clogging of the cheese at the outlet $s$ is prevented. These separated cheese constituents are composed largely of finely divided solids and, as hereinbefore stated, are not free-flowing. There is danger, therefore, that they may clog the outlet $s$ and even seal such outlet. While such clogging or sealing might be temporary, the discharge of the cheese constituents through the outlet $s$ may be so irregular as to prevent the most efficient operation of the centrifuge. In order to insure continuous and regular discharge of the cheese constituents, there is secured to the neck $g$ a member $z$ having at its lower end a blade or tongue located at the entrance to the outlet $s$. Due to the differential rotary movement of the neck $g$ the member $z$ will rotate not only more slowly than the wall $r$, but also more slowly than the outflowing cheese, whose angular speed of rotation, while outflowing toward the outlet $s$, will be equal to, or somewhat exceed, that of the bowl. The effect, therefore, of the member $z$, which may aptly be called a plow, is to cut through and stir the cheese constituents as they reach, or are approaching, the outlet $s$ and avoid danger of their clogging the outlet, thereby insuring continuous and regular discharge of the cheese constituents.

The separated cheese constituent, as hereinbefore stated, discharges into a receiving chamber $x$. The inner part of the bottom of this chamber is the top of the receiving pan $o$ for the serum, which is supported from a stationary frame 12 surrounding the centrifugal bowl. Secured to the receiving pan is an enclosure having a bottom wall 1 secured to the receiving pan $o$ and constituting the outer part of the bottom of the receiving chamber $x$, a peripheral wall 2 and a top wall 3 to which is secured a ring 4 surrounding a sleeve 5 on the feed pipe $f$. To the sleeve 5 is secured a pulley 6, which may be rotated at any desired (preferably slow) speed by a belt and driving means (not shown). The rotatable sleeve 5 has secured to it a radially extending arm 7 carrying at its outer end a scraper or conveyor 8, which is shown in the form of a wing or vane extending radially or somewhat backwardly from a radial line and just clearing the bottom 1 and peripheral wall 2 of the receiving chamber $x$. The bottom 1 is provided, at one place in its circumference, with an opening communicating with a pipe 11 leading to an ultimate cheese receiver (not shown). Carried by and extending inward from the scraper or conveyor 8 is a scraper rod 9 having secured thereto a branch scraper rod 10, these scrapers 9 and 10 barely clearing the top of the receiving pan $o$. These members 8, 9 and 10 convey the cheese constituents (which discharge into the receiving chamber $x$ in all radial directions) into the pipe 11 and prevent any accumulation of cheese along the bottom or peripheral wall of the receiving chamber $x$.

One great advantage of utilizing my invention in the manufacture of cheese from a prepared mixture of serum, butterfat and solids is that the time required for such manufacture is practically negligible; the product delivered from the receiving pan $x$ being the finished product. Another advantage is that the separation of the serum from the cheese constituents is substantially complete. Another, and perhaps major, advantage is that there is neither time nor opportunity for chemical or physical deterioration of the cheese in the process of expelling the serum, thereby so greatly enhancing the keeping qualities of the finished product that it is edible, without impairment of the flavor and with no discoverable deterioration, within a long period of time after its production.

The centrifuge may be utilized in the manufacture of most, if not all, varieties of cheese. Treatment in order to impart to the cheese any characteristic flavor may be in accordance with conventional procedures.

I do not herein claim such of the described improvements as are operative upon the cheese after its separation and discharge from the centrifuge, since such improvements do not necessarily depend for their successful operation upon the use of a centrifuge constructed and operated as herein described. Such improvements form the subject matter of another application filed by me November 10, 1944, Patent No. 2,432,829.

The claims herein are directed solely to the novel features of the centrifugal separator bowl.

While a centrifuge embodying my invention is primarily intended and adapted for the separation of cheese from serum, it may also be found useful and efficient in the separation of any solids or semi-solids from liquid where the solids are of lower specific gravity than the liquid.

What I claim and desire to protect by Letters Patent is:

1. A centrifuge adapted especially for the separation of cheese constituents from whey or serum of higher specific gravity, comprising a rotatable bowl body and bowl top, a bowl neck carried by, and rotatable relatively to, the bowl, a frusto-conical partition carried by said neck and dividing the bowl into an inner chamber for receiving and distributing the mixture to be separated and an outer separating chamber, means providing a passage between said chambers, a feed tube from which the mixture to be separated flows through said neck into said inner chamber and thence into said outer separating chamber, said separating chamber having a peripheral outlet for the heavier separated constituent and an annular outlet for the lighter separated constituent between the bowl top and the bowl neck and partition, and a plow rotatable with said neck and partition and located approximately at the outlet for the lighter separated constituent and adapted to prevent clogging of said outlet.

2. A centrifuge adapted especially for the separation of cheese constituents from whey or serum of higher specific gravity, comprising a rotatable bowl body and bowl top, a central bowl neck carried by, and freely rotatable relatively to, the bowl, a distributor within the bowl, a feed tube from which the mixture to be separated flows through said neck and distributor into the annular separating chamber between the distributor and the bowl wall, the separating chamber having a peripheral outlet for the heavier separated constituent, a wing between the bowl neck and bowl top adapted to centralize the neck, and a wall extending from the bowl top, said neck, wing, bowl top and wall forming between them a chamber having an annular opening communicating with the separating chamber and adapted to receive the separated lighter constituent.

3. A centrifuge as defined in claim 2 comprising also another chamber, above the last named chamber, formed between said bowl top and wing, there being a passage through said bowl top connecting the two last named chambers and an annular opening in the upper chamber between the bowl top and wing through which the separated lighter constituent is discharged from the centrifuge.

4. A centrifuge as defined in claim 2 comprising also a plow rotatable with said neck and located at approximately said opening and adapted to prevent clogging thereof.

5. A centrifuge as defined in claim 2 comprising also a plow rotatable with said neck and located at approximately said opening and adapted to prevent clogging thereof, and another chamber, above the last named chamber, formed between said bowl top and wing, there being a passage through said bowl top connecting the two last named chambers and an annular opening in the upper chamber between the bowl top and wing through which the separated lighter constituent is discharged from the centrifuge.

6. A centrifuge adapted especially for the separation of cheese constituents from whey or serum of higher specific gravity, comprising a driving spindle, a bowl, an axial sleeve thereon surrounding and carried by the spindle, a bowl neck above said spindle and sleeve and freely rotatable relative thereto, a distributor below said neck and communicating with the separating chamber, a feed tube opening into said neck, said neck having passages for flow of the mixture from the feed tube into the distributor, the separating chamber having a peripheral outlet for the heavier separated constituent and an annular outlet for the lighter separated constituent located near the axis of the bowl, and a plow rotatable with said neck and located at approximately the last named outlet and adapted to cut through the outflowing separated constituent and insure regular and continuous outflow of the lighter separated constituent.

7. A centrifuge adapted especially for the separation of cheese constituents from whey or serum of higher specific gravity, comprising a rotatable bowl, a bowl neck carried by, and freely rotatable relatively to, the bowl, a distributor within the bowl, a feed tube from which the mixture to be separated flows through said neck and distributor into the annular separating chamber between the distributor and the bowl wall, the separating chamber having a peripheral outlet for the heavier separated constituent and an annular outlet for the lighter separated constituent located near the axis of the bowl, a wing between said neck and the bowl top adapted to centralize the neck, a chamber enclosed by said neck, wing and bowl top adapted to receive the lighter separated constituent discharged from the separating chamber through said annular outlet, a chamber above the last named chamber, enclosed by said wing and bowl top, there being a passage through the bowl top connecting the two last named chambers and an annular opening between the bowl top and the wing through which the lighter separated constituent is discharged from the centrifuge.

8. A centrifuge adapted especially for the separation of cheese constituents from whey or serum of higher specific gravity, comprising a rotatable bowl, a bowl neck carried by, and freely rotatable relatively to, the bowl, a distributor within the bowl, a feed tube from which the mixture to be separated flows through said neck and distributor into the annular separating chamber between the distributor and the bowl wall, the separating chamber having a peripheral outlet for the heavier separated constituent and an annular outlet for the lighter separated constituent located near the axis of the bowl, the bowl top having a hole therethrough, a wing on said neck extending outward therefrom, thence upward in sliding engagement with the bowl top and thence outward over the bowl top; thus forming a lower chamber below said wing and between said neck and bowl top adapted to receive the lighter separated constituent discharged from the separating chamber, and an upper chamber between said bowl top and wing adapted to receive through said hole lighter separated constituent from the lower chamber, there being a narrow annular opening between the bowl top and said wing through which the lighter separated constituent is adapted to discharge from the upper chamber and thus from the centrifuge.

9. A centrifugal separator adapted especially for the separation of cheese constituents from whey or serum of higher specific gravity, comprising a rotatable bowl, shell and bowl top, a bowl neck within the bowl top, means by which the bowl neck is carried by the bowl while being turnable thereon, the bowl top having a sliding contact with the bowl neck to thereby centralize the bowl neck, a partition carried by the bowl neck and rotatable with it and dividing the bowl into a central distributing chamber and an outer annular separating chamber, there being an outlet for the lighter separated constituent at about the upper end of said partition, said chambers communicating at their lower ends, and a stationary feed tube above the bowl neck, the bowl neck having a passage for the mixture to be separated communicating at its upper end with the feed tube and at its lower end with the distributing chamber.

10. A centrifuge in accordance with claim 9 comprising also a plow carried by the bowl neck and located approximately at said outlet.

11. A centrifuge adapted especially for the separation of cheese constituents from whey or serum of higher specific gravity, comprising a rotatable bowl, a frusto-conical partitioning member within the bowl and a bottom extending inward from its lower end portion, thereby forming a distributing chamber for receiving the mixture to be separated and in which, under the relatively mild centrifugal force therein, heavy solid impurities are adapted to be separated and retained, said partitioning member forming the inner wall of the outer separation chamber, which progressively widens from its receiving end toward its discharging end, there being a passage affording communication between the inner lower part of the distributing chamber and the narrow lower part of the outer separating chamber, said separating chamber having a peripheral outlet for the heavier separated constituent and an annular outlet for the lighter separated constituent located near the axis of the bowl, the wider end of said frusto-conical member being located near one end of the bowl and near its periphery and the narrower end of said frusto-conical member extending to said outlet for discharge of the lighter constituent, and a plow located at approximately the outlet for the lighter separated constituent and rotatable with the bowl but at a different speed, the discharge from the outer separating chamber of the non-free-flowing lighter cheese constituent separated therein being effected with certainty by the sliding of the same toward the outlet along the wall of the frusto-conical partition and the cutting through and stirring by the plow of the cheese constituent to prevent clogging of the outlet.

12. A centrifuge for separating a mixture into relatively heavy and light constituents one of which is relatively resistant to flow, comprising a rotatable bowl having a separating chamber, a peripheral outlet from the chamber for the heavier separated constituent, and an outlet from the chamber for the lighter separated constituent and located near the axis of the bowl, means for feeding the mixture to the separating chamber, a driving spindle for rotating the bowl, and a bowl neck mounted on the spindle and rotatable thereon at a speed different from that of the bowl and spindle, the neck having a part disposed in the locus of the outlet for said flow-resistant constituent to prevent clogging, the bowl neck and the top of the bowl enclosing between them an annular chamber for receiving the discharge from the outlet for the lighter separated constituent and also a second annular chamber above the first named annular chamber, the bowl top having a part which divides said annular chambers each from the other, and which is provided with a passage connecting them.

GEORGE J. STREZYNSKI.

REFERENCES CITED

The following references are of record in the file of this patent:

UNITED STATES PATENTS

| Number | Name | Date |
|---|---|---|
| 2,263,708 | Svensjo et al. | Nov. 25, 1941 |
| 517,603 | D. J. Davis | Apr. 3, 1894 |

FOREIGN PATENTS

| Number | Country | Date |
|---|---|---|
| 440,905 | Great Britain | Jan. 8, 1936 |
| 270,626 | Italy | Jan. 15, 1930 |